A. T. HERRICK.
PIPE COUPLING.
APPLICATION FILED OCT. 27, 1906.

925,770.

Patented June 22, 1909.

Witnesses
Jos. F. Collins.
J. M. Wynkoop.

Inventor
Austin T. Herrick
By Knight Bros
Attorney

UNITED STATES PATENT OFFICE.

AUSTIN T. HERRICK, OF BRADFORD, PENNSYLVANIA.

PIPE-COUPLING.

No. 925,770.  Specification of Letters Patent.  Patented June 22, 1909.

Application filed October 27, 1906. Serial No. 340,878.

*To all whom it may concern:*

Be it known that I, AUSTIN T. HERRICK, a citizen of the United States, and resident of Bradford, in the county of McKean and State of Pennsylvania, have invented certain new and useful Improvements in Pipe-Couplings, of which the following is a specification.

This invention relates to pipe couplings. An object of my invention is to provide a coupling in which on one or both of the pipes, there is provided an enlargement for the clamping collars, whereby a more positive engagement between the pipe and the collar is secured.

A further object is to provide an improved connection between two pipes where the end of one fits within the end of the other, thus dispensing with the usual sleeve.

Other objects will appear in the following description and will be more particularly pointed out in the appended claim.

Figure 1:
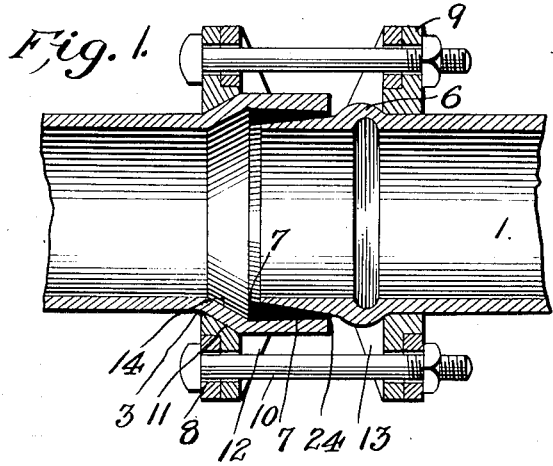
Figure 2:
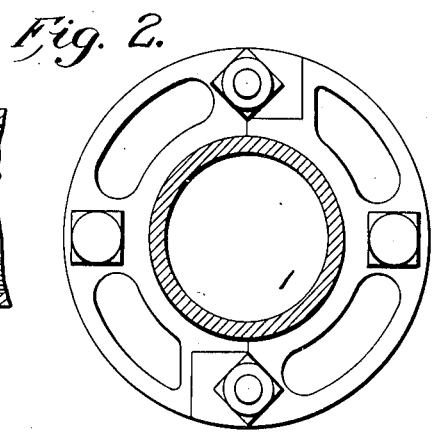
Figure 3:
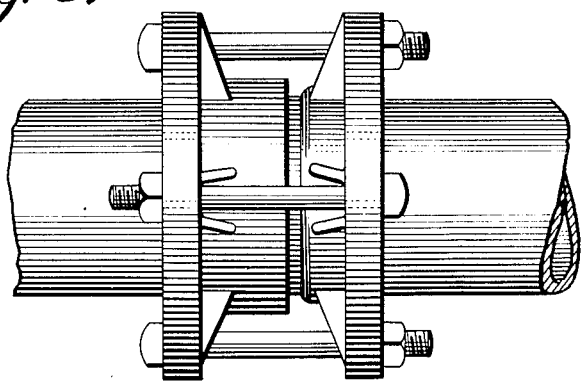

In the drawings: Figure 1 is a vertical section of one embodiment of my invention; Fig. 2 is a transverse section of one of the pipe members showing a clamping ring in elevation; Fig. 3 is a side elevation of the embodiment shown in Fig. 1.

Referring more particularly to the drawings, 1 indicates a pipe section, the opposed ends only of two sections being shown. One end of each section is provided with an enlarged portion 2 forming an inclined shoulder 3. The inner wall 4 of this enlarged portion is flared inwardly. The other end of each pipe is provided with a tapered end 5 and an annular shoulder 6 at the end of the tapered portion, the tapered portion being formed by tapering the outer wall and not the inner wall. This tapered end is adapted to fit within the enlarged end of another pipe, and a packing 7 of wedge shaped cross section is interposed between the inner flared wall of one and the outer tapered wall of the other.

The two sections of the pipe are held together by collars 8 and 9 connected by bolts 10; the collar 8 and 9 being preferably made of segments whereby they may be easily fitted about the pipe sections, the bolts serving to hold the segments together. The collar 8 has its bore 11 tapered so as to fit the inclined shoulder 3. The collar 8 is provided with projections 12 which have their inner ends in the plane of widest portion of the bore 11 so that they may rest upon the outer wall of the enlarged portion 2 and act as a brace for the collar. The collar 9 abuts the annular shoulder 6 and is provided on one face with braces 13 which are adapted to rest on the annular shoulder 6.

When the bolts 10 are adjusted to draw the collars together, the outer tapered wall 5 is forced against the packing 7 which is prevented from sliding from the enlarged portion by means of the internal tapered shoulder 14 which permits the exposure of the wide end of the packing ring. After the parts of the coupling are fitted together, the wide edge of the packing ring is exposed to the interior of the pipe and when the fluid, liquid or gas, is admitted to the pipe under pressure, the pressure acts to drive the packing toward the end of the enlarged portion and, as the walls confining the packing converge in this direction, the pressure makes a tighter joint.

Having thus described my invention, what I claim as new therein and desire to secure by Letters Patent is:

The combination of a pipe section having an enlarged end, the inner wall of which is flared inwardly from the end of the pipe, and having a shoulder with a tapered inner wall and a tapered outer wall at the inner end of the flared wall, a second pipe section having an annular shoulder and having one end provided with a tapered outer wall, said end being fitted in the enlarged end of the other section, a wedge shaped packing ring arranged between the two sections with its wider end adjacent to the tapered inner wall of the shoulder of the first-named pipe section and with the entire area of the end wall of the wider end exposed to the interior of the pipe, a collar having a tapering bore and having the wall of its bore fitted on the tapered outer wall of the shoulder of the first pipe section, a second collar engaging the shoulder of the second pipe section, and means connecting the collars and holding the pipe sections together.

The foregoing specification signed at Bradford Pennsylvania this 15th day of October, 1906.

AUSTIN T. HERRICK.

In presence of two witnesses—
MYERS TITUS,
J. W. COIT.